: US010737568B2

(12) United States Patent
Shinohara

(10) Patent No.: US 10,737,568 B2
(45) Date of Patent: Aug. 11, 2020

(54) GRILLE INNER ATTACHMENT STRUCTURE

(71) Applicant: TOYOTA JIDOSHA KABUSHIKI KAISHA, Aichi-ken (JP)

(72) Inventor: Masaomi Shinohara, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 1 day.

(21) Appl. No.: 16/275,219

(22) Filed: Feb. 13, 2019

(65) Prior Publication Data

US 2019/0248226 A1   Aug. 15, 2019

(30) Foreign Application Priority Data

Feb. 15, 2018   (JP) .................................. 2018-025393

(51) Int. Cl.
| | |
|---|---|
| *B60K 11/04* | (2006.01) |
| *B60R 19/52* | (2006.01) |
| *B60R 21/34* | (2011.01) |
| *B62D 21/15* | (2006.01) |
| *B62D 25/08* | (2006.01) |

(52) U.S. Cl.
CPC .............. *B60K 11/04* (2013.01); *B60R 19/52* (2013.01); *B60R 21/34* (2013.01); *B60R 2019/525* (2013.01); *B60R 2021/343* (2013.01); *B62D 21/152* (2013.01); *B62D 25/08* (2013.01)

(58) Field of Classification Search
CPC .......... B60K 11/04; B60R 19/52; B60R 21/34

USPC ....................................................... 296/193.1
See application file for complete search history.

(56) References Cited

U.S. PATENT DOCUMENTS

| | | | |
|---|---|---|---|
| 6,386,624 B1 * | 5/2002 | Schultz ................ | B62D 25/084 180/68.4 |
| 7,090,265 B2 * | 8/2006 | Otte ........................ | B60R 19/52 180/68.6 |
| 7,537,275 B2 * | 5/2009 | Naik ....................... | B60R 13/04 180/68.6 |
| 8,517,130 B2 * | 8/2013 | Sakai ................... | B60K 11/085 180/68.1 |

FOREIGN PATENT DOCUMENTS

JP       S61-80152 U     5/1986

* cited by examiner

*Primary Examiner* — Joseph D. Pape
(74) *Attorney, Agent, or Firm* — Hauptman Ham, LLP

(57) ABSTRACT

A grille inner attachment structure includes a grille inner disposed ahead of a radiator in a vehicle front-rear direction; and a vehicle body to which the grille inner is attached. The grille inner includes an arm portion attached and fixed to the vehicle body, a breaking start portion provided in the arm portion and configured to be broken to release the arm portion from the vehicle body when the grille inner receives a collision load from a vehicle front side, and an inclined surface inclined toward a vehicle rear side and an upper side. The vehicle body includes an inclined surface facing portion provided behind the inclined surface and ahead of the radiator in the vehicle front-rear direction, the inclined surface facing portion being provided at a position at which the inclined surface facing portion overlaps with the inclined surface when seen from the vehicle front side.

4 Claims, 3 Drawing Sheets

GRILLE INNER ATTACHMENT STRUCTURE

INCORPORATION BY REFERENCE

The disclosure of Japanese Patent Application No. 2018-025393 filed on Feb. 15, 2018 including the specification, drawings and abstract is incorporated herein by reference in its entirety.

BACKGROUND

1. Technical Field

The disclosure relates to a grille inner attachment structure in which a grille inner is attached to a vehicle body, the grille inner being disposed ahead of a radiator in a vehicle front-rear direction.

2. Description of Related Art

Japanese Utility Model Application Publication No. 61-080152 (JP 61-080152 U) discloses a grille inner that is disposed ahead of a radiator in a vehicle front-rear direction.

However, an attachment structure disclosed in JP 61-080152 U has the following problem. For example, in a minor collision test (a damage test) at 15 km/h or lower, in the case where the grille inner simply moves toward a vehicle rear side when the grille inner receives a collision load from a vehicle front side, the grille inner may directly hit a radiator, and thus, the radiator may be damaged. As a result, a damage grade may be lowered.

SUMMARY

The disclosure provides a grille inner attachment structure that makes it possible to prevent a grille inner from directly hitting a radiator and damaging the radiator during a minor collision.

An aspect of the disclosure relates to a grille inner attachment structure including a grille inner that is disposed ahead of a radiator in a vehicle front-rear direction; and a vehicle body to which the grille inner is attached. The grille inner includes an arm portion that is attached and fixed to the vehicle body, a breaking start portion that is provided in the arm portion and is configured to be broken so as to release the arm portion from the vehicle body when the grille inner receives a collision load from a vehicle front side, and an inclined surface that is inclined toward a vehicle rear side and an upper side. The vehicle body includes an inclined surface facing portion that is provided behind the inclined surface and ahead of the radiator in the vehicle front-rear direction, the inclined surface facing portion being provided at a position at which the inclined surface facing portion overlaps with the inclined surface when seen from the vehicle front side.

According to the above aspect, the following effects can be obtained. (i) The grille inner includes the arm portion that is attached and fixed to the vehicle body; and the breaking start portion that is provided in the arm portion and is configured to be broken so as to release the arm portion from the vehicle body when the grille inner receives the collision load from the vehicle front side. Accordingly, when the grille inner receives the collision load from the vehicle front side, the breaking start portion is broken. Thus, the arm portion is released from the vehicle body, and the grille inner moves toward the vehicle rear side with respect to the vehicle body. (ii) In addition, the grille inner includes the inclined surface that is inclined toward the vehicle rear side and the upper side, and the vehicle body includes the inclined surface facing portion. Accordingly, after the grille inner moves toward the vehicle rear side with respect to the vehicle body, and the inclined surface comes in contact with the inclined surface facing portion, the inclined surface moves upward (slides upward) on the inclined surface facing portion. Thus, the grille inner moves toward the vehicle rear side and the upper side. As a result, the grille inner can move to an area above the radiator while avoiding the radiator. Thus, the grille inner that moves to the vehicle rear side can be prevented from directly hitting the radiator. (iii) Accordingly, the radiator can be prevented from being damaged. Therefore, the damage to the radiator during a minor collision can be prevented, and lowering of a damage grade can be prevented.

In the above-described aspect, the vehicle body may include a radiator support that supports the radiator, and a bumper bracket that is supported by the radiator support; and the arm portion may be attached to the bumper bracket. With this configuration, the following effects can be obtained. (i) Since the vehicle body includes the radiator support that supports the radiator; and the bumper bracket that is supported by the radiator support, the grille inner can be disposed ahead of the radiator in the vehicle front-rear direction relatively easily in a normal time when the vehicle collision does not occur. (ii) In addition, since the arm portion is attached to the bumper bracket, the grille inner can be disposed ahead of the radiator in the vehicle front-rear direction such that the grille inner is away (distanced) from the radiator. Accordingly, when the grille inner moves toward the vehicle rear side and the upper side due to action of the inclined surface and the inclined surface facing portion during the collision, the grille inner can be prevented from colliding with the radiator during the movement. Thus, the grille inner can reliably move toward an area above the radiator while avoiding the radiator.

In the above-described aspect, a millimeter-wave radar may be attached to the grille inner. With this configuration, the following effects can be obtained. The millimeter-wave radar is attached to the grille inner. Accordingly, when the grille inner receives the collision load, the grille inner and the millimeter-wave radar can move together with respect to the vehicle body. Thus, the millimeter-wave radar can be prevented from receiving the collision load during the minor collision. As a result, damage to the millimeter-wave radar can be prevented, and lowering of the damage grade can be prevented.

In the above-described aspect, the grille inner may include a protection wall that is positioned behind the millimeter-wave radar in the vehicle front-rear direction. With this configuration, the following effects can be obtained. The grille inner includes the protection wall. Accordingly, when the grille inner receives the collision load and the grille inner and the millimeter-wave radar move together toward the vehicle rear side, members in the vicinity of the millimeter-wave radar, such as the vehicle body, can be prevented from hitting the millimeter-wave radar from the vehicle rear side. As a result, the damage to the millimeter-wave radar can be prevented, and lowering of the damage grade can be prevented.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
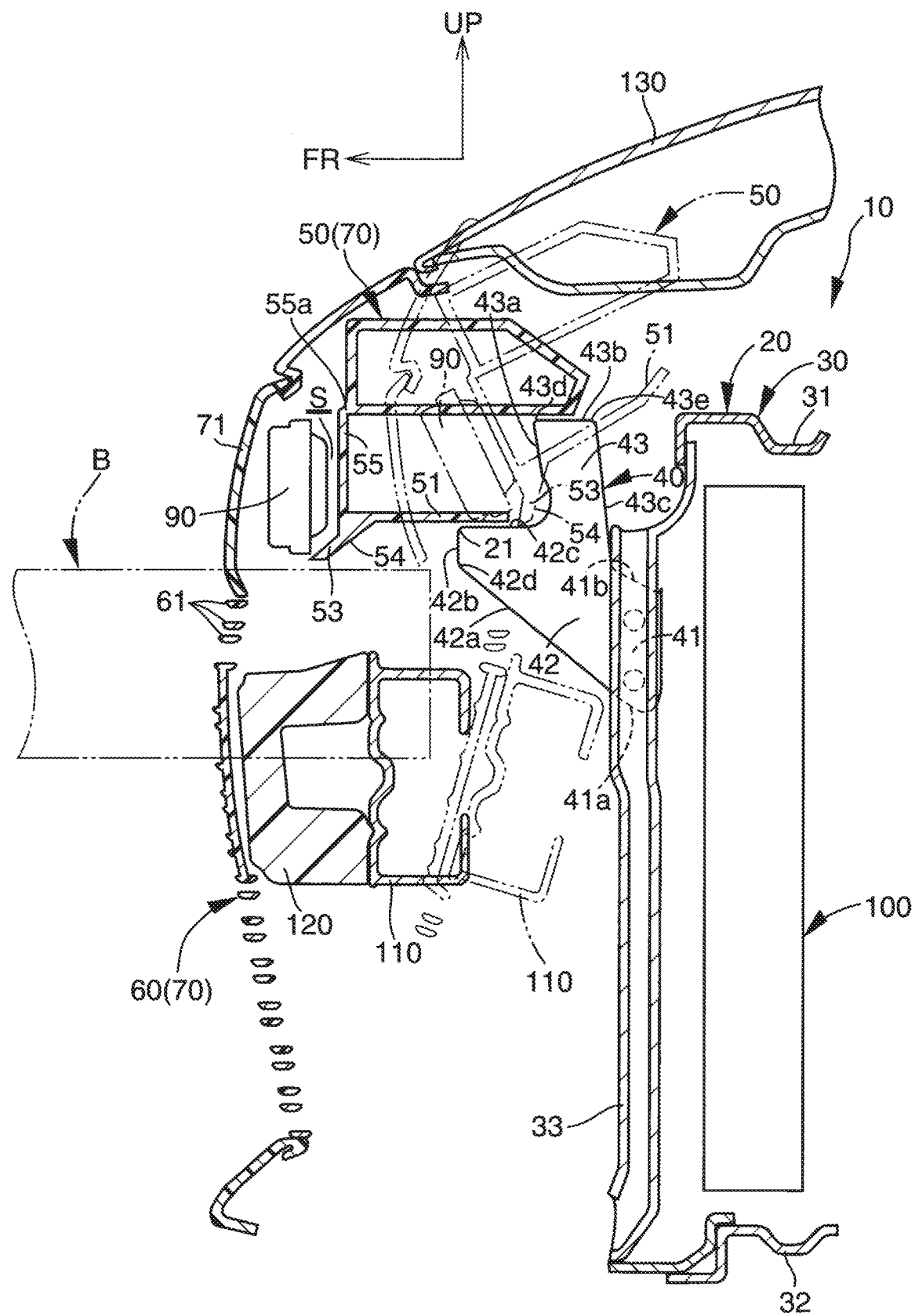
FIG. 1 is a schematic sectional view of a grille inner attachment structure and the vicinity thereof in an embodiment of the disclosure.

A description will hereinafter be provided on a grille inner attachment structure (hereinafter also simply referred to as an attachment structure) in an embodiment of the disclosure with reference to the drawings. Note that, in the drawings, FR indicates a vehicle front side and UP indicates an upper side.

A grille inner attachment structure (hereinafter also simply referred to as an attachment structure) 10 in the embodiment of the disclosure is a structure in which a grille inner 50 is attached to a vehicle body 20, the grille inner 50 being disposed ahead of a radiator 100 in a vehicle front-rear direction.

The vehicle body 20 is made of metal. As shown in FIG. 1, the vehicle body 20 includes a radiator support 30 and a bumper bracket 40 that is attached and fixed to the radiator support 30.

When seen in the vehicle front-rear direction, the radiator support 30 has a rectangular frame shape and is provided to surround the radiator 100. The radiator support 30 includes a radiator support upper member 31 that extends in a vehicle width direction; and a radiator support lower member 32 that extends in the vehicle width direction. The radiator support 30 further includes a coupling member 33 that extends in an up-down direction so as to couple central portions of the radiator support upper member 31 and the radiator support lower member 32 in the vehicle width direction. An upper end of the coupling member 33 is fixed to the radiator support upper member 31, and a lower end of the coupling member 33 is fixed to the radiator support lower member 32. The coupling member 33 is disposed ahead of the radiator 100 in the vehicle front-rear direction. The coupling member 33 is disposed such that a clearance is interposed between the coupling member 33 and the radiator 100 in the vehicle front-rear direction. A transverse sectional shape (a sectional shape that is orthogonal to the up-down direction) of the coupling member 33 is a U shape that is opened to one side in the vehicle width direction, for example.

A bumper reinforcement 110 that extends in the vehicle width direction is disposed ahead of, in the vehicle front-rear direction, an intermediate portion of the radiator support 30 in the up-down direction. An absorber 120 that extends in the vehicle width direction is disposed ahead of the bumper reinforcement 110 in the vehicle front-rear direction. An engine hood 130 that can open and close an engine compartment is disposed above the radiator support 30.

A body-side attachment portion 41 located at a rear end of the bumper bracket 40 in the vehicle front-rear direction is attached and fixed to the coupling member 33 of the radiator support 30 by bolt fastening, welding, or the like. In the case where the body-side attachment portion 41 of the bumper bracket 40 is fastened to the coupling member 33 by bolt fastening, the body-side attachment portion 41 of the bumper bracket 40 may be fastened to the coupling member 33 by the bolts at a plurality of positions (for example, two positions) spaced apart from each other in the up-down direction in order to strengthen coupling between the bumper bracket 40 and the coupling member 33 and to prevent relative rotation between the bumper bracket 40 and the coupling member 33.

In a side view, the bumper bracket 40 includes a forward extending portion 42 that extends toward the vehicle front side from the body-side attachment portion 41; and an upward extending portion 43 that extends toward the upper side from an intermediate portion of the forward extending portion 42 in the vehicle front-rear direction.

The forward extending portion 42 includes a lower surface 42a; a front surface 42b that extends from a front end of the lower surface 42a in the vehicle front-rear direction to the upper side; and an upper surface 42c that extends from an upper end of the front surface 42b toward the vehicle rear side to reach the upward extending portion 43.

The lower surface 42a of the forward extending portion 42 is continuous with a lower surface 41a of the body-side attachment portion 41. The lower surface 42a of the forward extending portion 42 is inclined toward the vehicle front side and the upper side. In other words, the lower surface 42a of the forward extending portion 42 is inclined toward the upper side in a direction toward the vehicle front side. Accordingly, when the bumper reinforcement 110 moves toward the vehicle rear side during a minor collision of the vehicle, interference of the bumper reinforcement 110 and the bumper bracket 40 with each other is prevented, and transmission of a collision load from the bumper reinforcement 110 to the bumper bracket 40 is thus prevented.

The front surface 42b of the forward extending portion 42 serves as a front end surface of the bumper bracket 40 and extends in a direction (the up-down direction) that is orthogonal to the vehicle front-rear direction. The lower surface 42a is continuous with the front surface 42b via a lower bent portion 42d. The lower bent portion 42d may be bent or curved. The upper surface 42c of the forward extending portion 42 is a horizontal surface that is orthogonal to the up-down direction, or a substantially horizontal surface. However, the upper surface 42c may be an inclined surface that is inclined toward the vehicle rear side and the upper side (i.e., an inclined surface that is inclined toward the upper side in a direction toward the vehicle rear side).

The upward extending portion 43 includes a rising surface 43a that extends toward the upper side from a rear end of the upper surface 42c of the forward extending portion 42 in the vehicle front-rear direction; an upper end surface 43b that extends from an upper end of the rising surface 43a toward the vehicle rear side; and a rear surface 43c that extends from a rear end of the upper end surface 43b toward a lower side.

The rising surface 43a of the upward extending portion 43 is inclined toward the vehicle front side and the upper side (i.e., the rising surface 43a is inclined toward the upper side in the direction toward the vehicle front side). The upper end surface 43b of the upward extending portion 43 serves as an upper end surface of the bumper bracket 40 and is a horizontal surface that is orthogonal to the up-down direction or a substantially horizontal surface. A bent portion 43d between the rising surface 43a and the upper end surface 43b may be bent or curved. The rear surface 43c of the upward extending portion 43 may extend in the direction that is orthogonal to the vehicle front-rear direction, or may be inclined toward the vehicle rear side and the lower side (i.e., may be inclined toward the lower side in the direction toward the vehicle rear side). A bent portion 43e between the upper end surface 43b and the rear surface 43c may be bent or curved. A lower end of the rear surface 43c is curved toward the vehicle rear side and is continues with an upper surface 41b of the body-side attachment portion 41.

The grille inner 50 and a grille outer 60 constitute a radiator grille 70 of the vehicle. The grille outer 60 includes a plurality of fin portions 61, each of which extends in the vehicle width direction. A space between the fin portions 61 adjacent to each other in the up-down direction serves as an air passage. An emblem 71 as a design member is attached to a central portion of the radiator grille 70 in the vehicle width direction. The emblem 71 may be attached to the grille outer 60 or may be attached to the grille inner 50.

Figure 3:
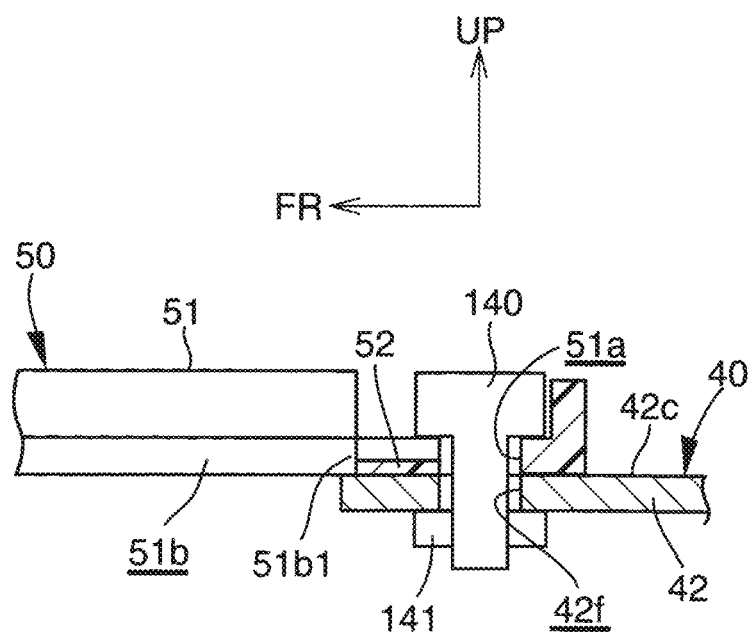
FIG. 3 is a sectional view that is taken along line in FIG. 2.

The grille inner 50 is made of resin, for example. The grille inner 50 includes an arm portion 51 that is attached and fixed to the vehicle body 20. The arm portion 51 is located in a central portion in the vehicle width direction and is provided at the same position as the position of the bumper bracket 40 in the vehicle width direction. In the side view, the arm portion 51 is provided so as to extend linearly in the vehicle front-rear direction that is orthogonal to the up-down direction. The arm portion 51 is attached and fixed to the bumper bracket 40. More specifically, as shown in FIG. 3, in a state where a fastening hole 42f provided in the upper surface 42c of the forward extending portion 42 of the bumper bracket 40 and a fastening hole 51a provided at a rear end of the arm portion 51 in the vehicle front-rear direction overlap each other in the up-down direction, a fastener 140 that is a bolt, a pin, or the like is inserted through both of the holes 42f, 51a, and the fastener 140 is screwed into a nut 141. In this way, the arm portion 51 is attached and fixed to the upper surface 42c of the forward extending portion 42 of the bumper bracket 40.

Figure 2:
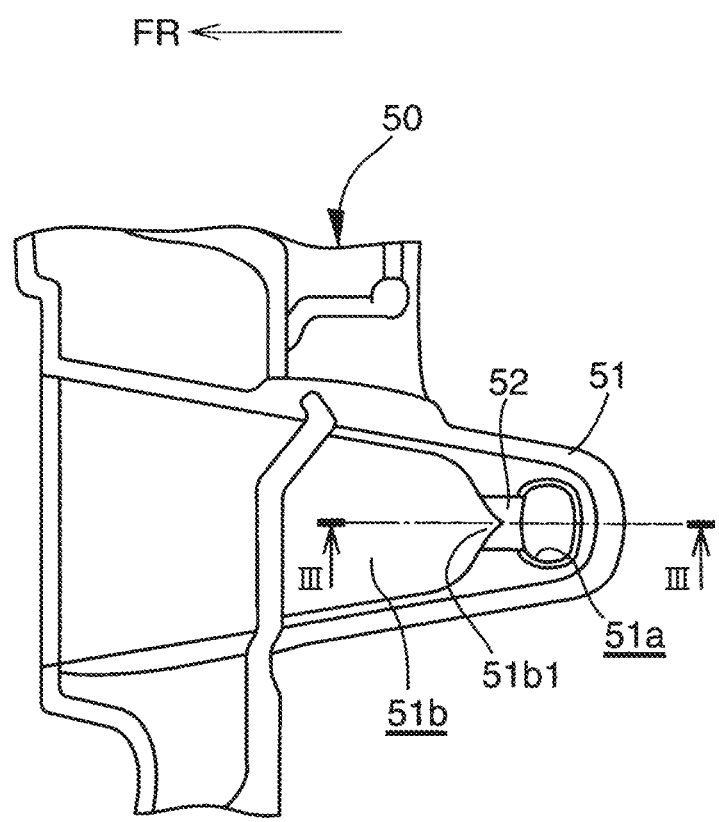
FIG. 2 is a partial plan view of an arm portion of a grille inner and the vicinity thereof in the grille inner attachment structure in the embodiment of the disclosure.

As shown in FIG. 2 and FIG. 3, the arm portion 51 is provided with a space portion 51b that is located ahead of the fastening hole 51a in the vehicle front-rear direction such that a clearance is interposed between the space portion 51b and the fastening hole 51a. The space portion 51b is provided so as to extend through the arm portion 51 in the up-down direction (i.e., a plate thickness direction of the arm portion 51). The space portion 51b is provided so as to extend in the vehicle front-rear direction. The length of the space portion 51b in the vehicle width direction is larger than the length of the fastening hole 51a in the vehicle width direction.

The arm portion 51 is provided with a breaking start portion 52. When the grille inner 50 receives the collision load from the vehicle front side, the breaking start portion 52 is broken so as to release the arm portion 51 from the vehicle body 20. The breaking start portion 52 is provided between the fastening hole 51a and the space portion 51b in the vehicle front-rear direction. The breaking start portion 52 is a portion that separates the fastening hole 51a and the space portion 51b from each other in the vehicle front-rear direction. The breaking start portion 52 is provided between the fastening hole 51a and the space portion 51b such that the breaking start portion 52 is continuous with the fastening hole 51a and the space portion 51b. The breaking start portion 52 has the smallest plate thickness (for example, the plate thickness of approximately 0.8 mm) in the arm portion 51, and thus, the breaking start portion 52 is most likely to be broken in the arm portion 51. A rear end 51b1 (i.e., an end at the fastening hole 51a-side) of the space portion 51b in the vehicle front-rear direction may be tapered toward the vehicle rear side such that, when the grille inner 50 receives the collision load, stress is concentrated on the breaking start portion 52 and the breaking start portion 52 is broken first in the arm portion 51 (i.e., the breaking start portion 52 is broken at the earliest time in the arm portion 51).

As shown in FIG. 1, the grille inner 50 includes a projected portion 53 that is projected toward the lower side from a front end of the arm portion 51 in the vehicle front-rear direction or from a portion in the vicinity of the front end of the arm portion 51. A rear surface of the projected portion 53 in the vehicle front-rear direction is an inclined surface 54 that is inclined toward the vehicle rear side and the upper side (i.e., an inclined surface 54 that is inclined toward the upper side in the direction toward the vehicle rear side). The vehicle body 20 includes an inclined surface facing portion 21 that is provided behind the inclined surface 54 in the vehicle front-rear direction. The inclined surface facing portion 21 is provided at a position at which the inclined surface facing portion 21 faces the inclined surface 54 with a distance being provided therebetween in the vehicle front-rear direction. The inclined surface facing portion 21 is configured as a bent portion between the front surface 42b and the upper surface 42c in the forward extending portion 42 of the bumper bracket 40. The inclined surface facing portion 21 is provided behind the inclined surface 54 and ahead of the radiator 100 in the vehicle front-rear direction. The inclined surface facing portion 21 is provided at a position at which the inclined surface facing portion 21 overlaps with the inclined surface 54 when seen from the vehicle front side. The inclined surface facing portion 21 is located below an upper end of the inclined surface 54 and above a lower end of the inclined surface 54 in the up-down direction.

When the grille inner 50 receives the collision load and moves toward the vehicle rear side, the inclined surface 54 hits the inclined surface facing portion 21 and moves upward (slides upward) on the inclined surface facing portion 21. Accordingly, in order to allow the inclined surface 54 to move upward on the inclined surface facing portion 21 relatively easily, the inclined surface facing portion 21 may have a curved shape, instead of a bent shape in the side view.

The emblem 71 is disposed ahead of the inclined surface 54 in the vehicle front-rear direction with a clearance being interposed therebetween. In addition, between the inclined surface 54 and the emblem 71, a millimeter-wave radar 90 is disposed to detect another vehicle and the like. Note that, because the millimeter-wave radar 90 is disposed behind the emblem 71 in the vehicle front-rear direction, the millimeter-wave radar 90 may be referred to as a millimeter-wave emblem. The millimeter-wave radar 90 is attached to (supported by) the grille inner 50. The inclined surface 54 is located behind only a lower end of the millimeter-wave radar 90 and the vicinity of the lower end of the millimeter-wave radar 90 in the vehicle front-rear direction. The inclined surface 54 is not located behind a large portion of the millimeter-wave radar 90 including an upper end thereof, in the vehicle front-rear direction.

The grille inner 50 includes a protection wall 55 that is located behind the millimeter-wave radar 90 in the vehicle front-rear direction so as to cover the millimeter-wave radar 90 from the vehicle rear side. The protection wall 55 is provided so as to extend from the front end of the arm portion 51 in the vehicle front-rear direction or a portion in the vicinity of the front end, toward the upper side. An upper end 55a of the protection wall 55 is located above an upper end of the millimeter-wave radar 90. A slight clearance S is provided between the protection wall 55 and the millimeter-wave radar 90 in the vehicle front-rear direction so as to prevent interference therebetween in a normal time when a vehicle collision does not occur.

Here, a description will be provided on an operation at the time when the vehicle collides with a collision barrier B at a relative speed of 15 km/h or lower (during the minor collision).

When the grille inner 50 receives the collision load, the breaking start portion 52, which is shown in FIG. 2 and FIG. 3, is broken. Then, while the fastener 140 remains inserted through the fastening hole 42f of the bumper bracket 40, the fastener 140 moves from the fastening hole 51a of the grille inner 50 to the space portion 51b of the grille inner 50 through the breaking start portion 52 that has been broken. As a result, the arm portion 51 is released from the bumper bracket 40 (the vehicle body 20), and the grille inner 50 can move with respect to the vehicle body 20. Thus, after the arm portion 51 is released from the bumper bracket 40, the grille inner 50 moves toward the vehicle rear side with respect to the vehicle body 20.

As shown in FIG. 1, when the grille inner 50 moves toward the vehicle rear side with respect to the vehicle body 20, the inclined surface 54 contacts (hits) the inclined surface facing portion 21 of the vehicle body 20 and moves upward (slides upward) on the inclined surface facing portion 21 of the vehicle body 20. At this time, since the inclined surface facing portion 21 has the curved shape in the side view, the inclined surface 54 moves upward on the inclined surface facing portion 21 while the inclined surface 54 is prevented from being cut (i.e., prevented from being bored).

After moving upward on the inclined surface facing portion 21, the inclined surface 54 moves toward the vehicle rear side along the upper surface 42c of the forward extending portion 42 of the bumper bracket 40 and hits the upward extending portion 43 of the bumper bracket 40. At this time, since the rising surface 43a of the upward extending portion 43 is inclined toward the vehicle front side and the upper side (i.e., inclined toward the upper side in the direction toward the vehicle front side), the inclined surface 54 is prevented from further moving upward (sliding upward) on the upward extending portion 43.

Next, a description will be made on effects of the embodiment of the disclosure. (A) (i) The grille inner 50 includes the arm portion 51 that is attached and fixed to the vehicle body 20; and the breaking start portion 52 that is provided in the arm portion 51 and is configured to be broken so as to release the arm portion 51 from the vehicle body 20 when the grille inner 50 receives the collision load from the vehicle front side. Accordingly, when the grille inner 50 receives the collision load from the vehicle front side, the breaking start portion 52 is broken. Thus, the arm portion 51 is released from the vehicle body 20, and the grille inner 50 moves toward the vehicle rear side with respect to the vehicle body 20. (ii) In addition, the grille inner 50 includes the inclined surface 54 that is inclined toward the vehicle rear side and the upper side (i.e., inclined toward the upper side in the direction toward the vehicle rear side), and the vehicle body 20 includes the inclined surface facing portion 21. Accordingly, after the grille inner 50 moves toward the vehicle rear side with respect to the vehicle body 20 and the inclined surface 54 comes in contact with the inclined surface facing portion 21, the inclined surface 54 moves upward (slides upward) on the inclined surface facing portion 21. Thus, the grille inner 50 moves toward the vehicle rear side and the upper side (i.e., toward a rear upper side). As a result, the grille inner 50 can move to an area above the radiator 100 (i.e., an area above the radiator support upper member 31) while avoiding the radiator 100. Thus, the grille inner 50 that moves toward the vehicle rear side can be prevented from directly hitting the radiator 100. (iii) Accordingly, the radiator 100 can be prevented from being damaged. Therefore, the damage to the radiator 100 during the minor collision can be prevented, and lowering of a damage grade can be prevented.

(B) Since the vehicle body 20 includes the radiator support 30 that supports the radiator 100; and the bumper bracket 40 that is supported by the radiator support 30, the grille inner 50 can be disposed ahead of the radiator 100 in the vehicle front-rear direction relatively easily in the normal time when the vehicle collision does not occur.

(C) Since the arm portion 51 of the grille inner 50 is attached to the bumper bracket 40, the grille inner 50 can be disposed ahead of the radiator 100 in the vehicle front-rear direction such that the grille inner 50 is away (distanced) from the radiator 100. Accordingly, when the grille inner 50 moves toward the vehicle rear side and the upper side (i.e., toward the rear upper side) due to action of the inclined surface 54 and the inclined surface facing portion 21 during the collision, the grille inner 50 can be prevented from colliding with the radiator 100 during the movement. Thus, the grille inner 50 can reliably move toward an area above the radiator 100 while avoiding the radiator 100.

(D) The millimeter-wave radar 90 is attached to the grille inner 50. Accordingly, when the grille inner 50 receives the collision load, the grille inner 50 and the millimeter-wave radar 90 can move together with respect to the vehicle body 20. Thus, the millimeter-wave radar 90 can be prevented from receiving the collision load during the minor collision. As a result, damage to the millimeter-wave radar 90 can be prevented, and lowering of the damage grade can be prevented.

(E) The grille inner 50 includes the protection wall 55. Accordingly, when the grille inner 50 receives the collision load, and the grille inner 50 and the millimeter-wave radar 90 move together toward the vehicle rear side, members in the vicinity of the millimeter-wave radar 90, such as the vehicle body 20, can be prevented from hitting the millimeter-wave radar 90 from the vehicle rear side. Thus, even when the millimeter-wave radar 90 and the grille inner 50 move together toward the vehicle rear side, the damage to the millimeter-wave radar 90 can be prevented. Therefore, lowering of the damage grade can be prevented.

(F) The lower surface 42a of the forward extending portion 42 of the bumper bracket 40 is inclined toward the vehicle front side and the upper side (i.e., inclined toward the upper side in the direction toward the vehicle front side). Accordingly, when the bumper reinforcement 110 moves toward the vehicle rear side during the minor collision of the vehicle, the bumper reinforcement 110 can be prevented from hitting the bumper bracket 40, and thus the transmission of the collision load from the bumper reinforcement 110 to the bumper bracket 40 can be prevented. As a result, the vehicle body 20 can be prevented from receiving the collision load from the bumper bracket 40 (i.e., the input of the collision load to the vehicle body 20 from the bumper bracket 40 can be prevented), and the damage to the radiator 100 caused by the input of the collision load to the vehicle body 20 can be prevented.

(G) The arm portion 51 of the grille inner 50 is provided with the breaking start portion 52 whose plate thickness is reduced. In addition, after the breaking start portion 52 is broken, the fastener 140 moves from the fastening hole 51a to the space portion 51b. Thus, the arm portion 51 is released from the bumper bracket 40 (the vehicle body 20). Thus, with the simple configuration, it is possible to release the arm portion 51 from the bumper bracket 40.

What is claimed is:

1. A grille inner attachment structure comprising:
a grille inner that is disposed ahead of a radiator in a vehicle front-rear direction; and
a vehicle body to which the grille inner is attached, wherein:
the grille inner includes an arm portion that is attached and fixed to the vehicle body, a breaking start portion that is provided in the arm portion and is configured to be broken so as to release the arm portion from the vehicle body when the grille inner receives a collision load from a vehicle front side, and an inclined surface that is inclined toward a vehicle rear side and an upper side; and
the vehicle body includes an inclined surface facing portion that is provided behind the inclined surface and ahead of the radiator in the vehicle front-rear direction, the inclined surface facing portion being provided at a position at which the inclined surface facing portion overlaps with the inclined surface when seen from the vehicle front side.

2. The grille inner attachment structure according to claim 1, wherein:
the vehicle body includes a radiator support that supports the radiator, and a bumper bracket that is supported by the radiator support; and
the arm portion is attached to the bumper bracket.

3. The grille inner attachment structure according to claim 1, wherein a millimeter-wave radar is attached to the grille inner.

4. The grille inner attachment structure according to claim 3, wherein the grille inner includes a protection wall that is positioned behind the millimeter-wave radar in the vehicle front-rear direction.

* * * * *